United States Patent
Furstenberg et al.

(10) Patent No.: US 11,692,982 B2
(45) Date of Patent: Jul. 4, 2023

(54) SPIN COATED STATIONARY PHASE MICROFABRICATED GAS CHROMATOGRAPHIC COLUMNS

(71) Applicant: The Government of the United States of America, as represented by the Secretary of the Navy, Arlington, VA (US)

(72) Inventors: Robert Furstenberg, Largo, MD (US); Christopher Breshike, Spotsylvania, VA (US); Todd H. Stievater, Arlington, VA (US); Dmitry Kozak, Sunderland, MD (US); R. Andrew McGill, Lorton, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 427 days.

(21) Appl. No.: 16/870,027

(22) Filed: May 8, 2020

(65) Prior Publication Data

US 2020/0355652 A1    Nov. 12, 2020

Related U.S. Application Data

(60) Provisional application No. 62/845,913, filed on May 10, 2019.

(51) Int. Cl.
*B01J 20/28*    (2006.01)
*B01J 20/32*    (2006.01)
*G01N 30/60*    (2006.01)
*G01N 30/02*    (2006.01)

(52) U.S. Cl.
CPC .... *G01N 30/6095* (2013.01); *B01J 20/28052* (2013.01); *B01J 20/32* (2013.01); *B01J 2220/54* (2013.01); *G01N 2030/025* (2013.01)

(58) Field of Classification Search
CPC .......... G01N 30/6095; G01N 2030/025; B01J 20/28052; B01J 20/32; B01J 2220/54
See application file for complete search history.

(56) References Cited

U.S. PATENT DOCUMENTS

| | | | |
|---|---|---|---|
| 2009/0104709 A1* | 4/2009 | Haushalter | B01L 3/0248 264/220 |
| 2013/0133402 A1* | 5/2013 | Kim | G01N 30/6095 73/23.39 |
| 2015/0300998 A1* | 10/2015 | Suslick | B01J 20/285 525/476 |

OTHER PUBLICATIONS

Written Opinion of International Search Report for corresponding PCT/US20/32040. dated Nov. 19 (Year: 2020).*

(Continued)

*Primary Examiner* — Benjamin L Lebron
(74) *Attorney, Agent, or Firm* — US Naval Research Laboratory; Rebecca Forman

(57) ABSTRACT

Presented herein is a new concept of uniformly spin coating a flat surface with a stationary phase and creating a gas chromatography column by pressing a grooved lid, with micro-stamped ridges, down onto the coated substrate. The lids are molded out of commercially available rigid materials including epoxies so that when pressed onto a flat surface it will create an air tight seal. The epoxy material is rendered inert by a thin layer of gold.

17 Claims, 5 Drawing Sheets

(56) References Cited

OTHER PUBLICATIONS

Rankin, J., and Suslick, K., "The development of a disposable gas chromatography microcolumn", Chern. Commun., 51, 8920. (Year: 2015).*

Furstenberg, R., et al, Photonic micro-gas-chromatography detection of chemical threat agents, Chemical, Biological, Radiological, Nuclear, and Explosives (CBRNE) Sensing XIX, edited by Jason A. Guicheteau, Augustus Way Fountain III, Chris R. Howie, Proc. of SPIE vol. 10629, 1062906 (Year: 2018).*

Yang, L., et al., "Review on stationary phases and coating methods of MEMs gas chromatography columns", Reviews in Analytical Chemistry, 39: 247-259. (Year: 2020).*

Breshike, C., et al., "Gas chromatography using a spin-coated stationary phase and a molded elastomer micro-channel", Journal of Chromatograghy A, 1610, 460555. (Year: 2020).*

\* cited by examiner

SPIN COATED STATIONARY PHASE MICROFABRICATED GAS CHROMATOGRAPHIC COLUMNS

CROSS-REFERENCE TO RELATED APPLICATIONS

This application is a non-provisional application of U.S. Provisional Application No. 62/845,913, filed on May 10, 2019, the contents of which is incorporated herein by reference in its entirety.

TECHNICAL FIELD

This application relates generally to gas chromatography separation columns, and more specifically to stationary phase materials in microfabricated gas chromatographic columns and the related method of making the microfabricated gas chromatographic columns.

BACKGROUND OF THE INVENTION

There is a push for the miniaturization of analytical chemistry instruments to reduce cost of analysis and enable novel portable applications (e.g. handheld point detectors) for the detection of hazardous chemicals such as toxic industrial chemicals (TICS), Chemical Warfare Agents (CWA's) or explosives. A lot of innovation has come in the miniaturization of gas chromatography (GC) columns. Silicon has emerged as a favorable platform substrate to etch column channels using various methods. These column channels can then be pressed or bonded together, requiring alignment of said channels or onto a flat surface like silicon or glass to complete the columns. Stationary phases must then be applied dynamically or statically to these columns from a solution of the stationary phase in a suitable solvent. In a dynamic process, the solution is pumped through the column over a period of time and the stationary phase is deposited on the wetted surfaces; whereas in the static process, the solution is used to fill the column and one end is capped while at the other end a reduced pressure is applied to remove solvent from the solution resulting in a stationary phase coating on the inner wall of the column. In both these approaches, it is desirable to coat the stationary phase as a uniform coating with a reproducible coating thickness between multiple columns to provide a useful quality control over the GC columns and reproducibility for GC retention times between different columns. This is not a trivial process and requires a set of coating deposition parameters to be controlled (solvent, concentration, solution flow rate, evacuation pressure, column temperature, evacuation time) and optimized for each stationary phase, and regardless of these parameters, the time to deposit each coating takes multiple hours if a uniform stationary phase coating is to be achieved. The silicon etching process itself is time consuming and the silicon foundry processing times add significant cost to column fabrication, which can negate the purpose of the miniaturization. Characterization of the coated micro-fabricated columns is challenging because once coated, the two pieces may not be easily separated to inspect the coating normally leaving only a destructive path to allow the user to usefully qualify coating quality. This typically involves cutting the columns to reveal the cross section and taking SEM images to ensure uniform coating, but this only qualifies or quantifies the coating thicknesses at selected points along a column which do not necessarily represent the full length of the coated column. This is true for micro-fabricated systems as well as conventionally drawn capillary columns. Other systems have been developed that incorporate the stationary phase directly into the column wall (Chem. Commun., 2015, 8920-8923). These devices provide the potential to be inexpensive and even considered disposable but are limited to the type of chromatography they can perform by the material properties of the substrate and incorporated stationary phase.

For microfabricated systems that incorporate gas chromatography separation columns, a significant challenge is the uniform loading of a tubular column with the stationary phase. This derives from solution wetting issues at non uniform etched surfaces or edges resulting from misaligned silicon structures.

SUMMARY OF THE INVENTION

The invention described herein, including the various aspects and/or embodiments thereof, meets the unmet needs of the art, as well as others, by providing a simple method of providing a gas chromatography separation column with a stationary phase. The stationary phase is deposited via spin coating on a planar substrate, followed by press sealing and formation of the tubular column with a molded lid with the required grooves. Spin coating the stationary phase allows uniform and controlled thickness deposition of the stationary phase in a simple rapid low cost approach to minimize fabrication times and any associated labor or hardware costs. Provided the planar substrate is optically transparent at relevant wavelengths, it also allows for active optical spectroscopy to be performed within the stationary phase inside and along the column for detections during chromatography separations.

The present invention provides a rapid, inexpensive, simple approach to microstamp and coat gas chromatography (GC) columns with high fidelity providing a path for disposable applications. This invention is useful to reduce the cost barrier to commercial transition technology path while maintaining or improving device quality control. Some benefits of the present invention include:

Rapid, inexpensive, simple approach to microstamp and coat GC columns with high fidelity providing path for disposable applications;
Reduces labor/time from days to minutes;
Offers a universal method for all stationary phases to be deposited;
Offers in situ quality control inspection directly after coating using visual or microscopy;
Eliminates need for high engineering required for capillary systems;
Simple process to microStamp gas chromatography columns with high fidelity;
Simple spin coating technique to rapidly coat planar GC substrate with high fidelity;
Allows disposable GC columns to be produced;
Spin coating stationary phase for use in chromatography saves time and labor; and
Increases level of quality control for stationary phase deposition.

The present invention allows for a rapid deposition of stationary phases for gas chromatography with superior thickness and uniformity control. Because the stationary phase is deposited on a flat substrate it is also easy to provide post coating characterization for quality control procedures in a production setting. Traditional procedures for coating stationary phases take hours to days and have to be refined for each new stationary phase. The invention also allows for facile testing for new stationary phases and also provides access to monitoring stationary phase-analyte interactions inside and along the column, via optical probing, if the stationary phase is spin coated onto an optically transparent substrate—as is demonstrated in this invention. Because the spin coating technique is quick, taking between 1-5 minutes, it will allow the possibility to treat the GC column as a disposable device, in the event of contamination or stationary phase decomposition. In addition it will allow for an inexpensive fabrication technique when micro gas analyzers are in production (hand held or smaller devices). Along with ease of stationary phase deposition this new fabrication method is viable for a plethora of separation techniques, such as multidimensional chromatography and inverse chromatography just to name a few. The invention also provides an approach to coating multiple stationary phases in a layered or masked approach. For a layered system of stationary phases it would work best if a solvent for the second layer was chosen so it would not dissolve the first layer. This restriction is not required if a masking procedure is utilized to coat the stationary phases in a segmented approach. This eliminates the need for undesirable coupling or valves between columns in multidimensional GC techniques. So for example, in a single column configuration, the invention allows a non-polar stationary phase to be deposited to separate by molecular size and a polar stationary phase to separate by analyte polarity. In addition, the invention affords the capability to introduce stationary phase gradients in the column. This can be advantageous to allow a column focusing on analyte bands as they progress along the column. Stationary phase gradients may be introduced from one side to another or from the outside inwards to the center of the column depending on the need. In addition, a localized thicker region of stationary phase can be deposited. This would be useful to provide the ability to operate injections with larger than normal analyte injections which might otherwise overload a thin stationary phase coating near the injection region and produce skewed tailing.

Forming a column using a spin coated stationary phase substrate and pressing a lid with the column cast into it allows for the implementation of a previous patent involving in column detection (U.S. Pat. No. 9,599,567 to McGill et al. (2017)).

Other features and advantages of the present invention will become apparent to those skilled in the art upon examination of the following or upon learning by practice of the invention.

BRIEF DESCRIPTION OF THE DRAWINGS

FIG. 2A is a diagram for casting the mold bottom, and FIG. 2B is a diagram for casting the GC lid.

(FIG. 4A) and for a temperature ramped with initial temperature of 55° C. held for 3 minutes then ramped at 35° C./min to 150° C. (FIG. 4B).

DETAILED DESCRIPTION OF EMBODIMENTS OF THE INVENTION

The present invention provides a novel, simple, and inexpensive mold-based technique for rapid production of gas chromatography columns. While the original motivation for this work was to support the development of an optical in-column detection system, this new chromatography concept has much wider applicability. For example, it can assist in the development of new sorbent materials to act as possible stationary phases in microfabricated devices or used in inverse GC studies. The stationary phase for this technique is applied via spin-coating onto a glass slide and pressing the lid to form an air tight seal. Spin-coating the stationary phase provides improved control over thickness deposition and uniformity than traditional means and is a rapid approach for production considerations, saving in labor and overhead costs, albeit at the cost of not having all tubular surfaces in the column coated. The assembled microcolumn may be treated as a disposable device and may be coupled directly into existing or conventional GC systems as an upgrade path. This fabrication method is not only inexpensive and simple but it allows for versatility in design and quality control. The method is not tied to any single stationary phase and could be utilized to screen test new sorbents in development for analytical or protection applications.

In one embodiment, a master mold with 0.3 m long, 200 μm deep and 500 μm wide channels separated by 500 μm thick walls was used to fabricate secondary molds for casting of the GC micro-columns. In this way, a single master mold produces multiple molds which can dramatically scale up production with each molded piece incorporating the same uniform structure obtained with the master mold. The beginning and end of the channel in each secondary mold have wires installed so that during casting they can hold lengths of commercial capillary guard columns, which provides for the inlet and outlet of the molded column. The lids with channels were cast out of commercially available epoxy material purchased from Smooth-On (Macungie, Pa., USA), EpoxAcast 670HT. Other rigid materials and epoxy materials can be used as well. EpoxAcast 670HT is a hard epoxy but still flexible enough to create an airtight seal against a flat surface coated with a stationary phase. For developmental and proof of concept purposes a non-polar stationary phase, OV-1 was selected because it has been well characterized and is widely used in the field of gas chromatography as a boiling point separator. The OV-1 was purchased from Ohio Valley Specialty Company (Marietta, Ohio, USA). A solution, containing 1.5% by mass of OV-1 in toluene, was spin-coated onto a glass microscope slide and a Germanium prism. The coated glass slide was characterized by atomic force microscopy (AFM).

Figures 1A, 1B:
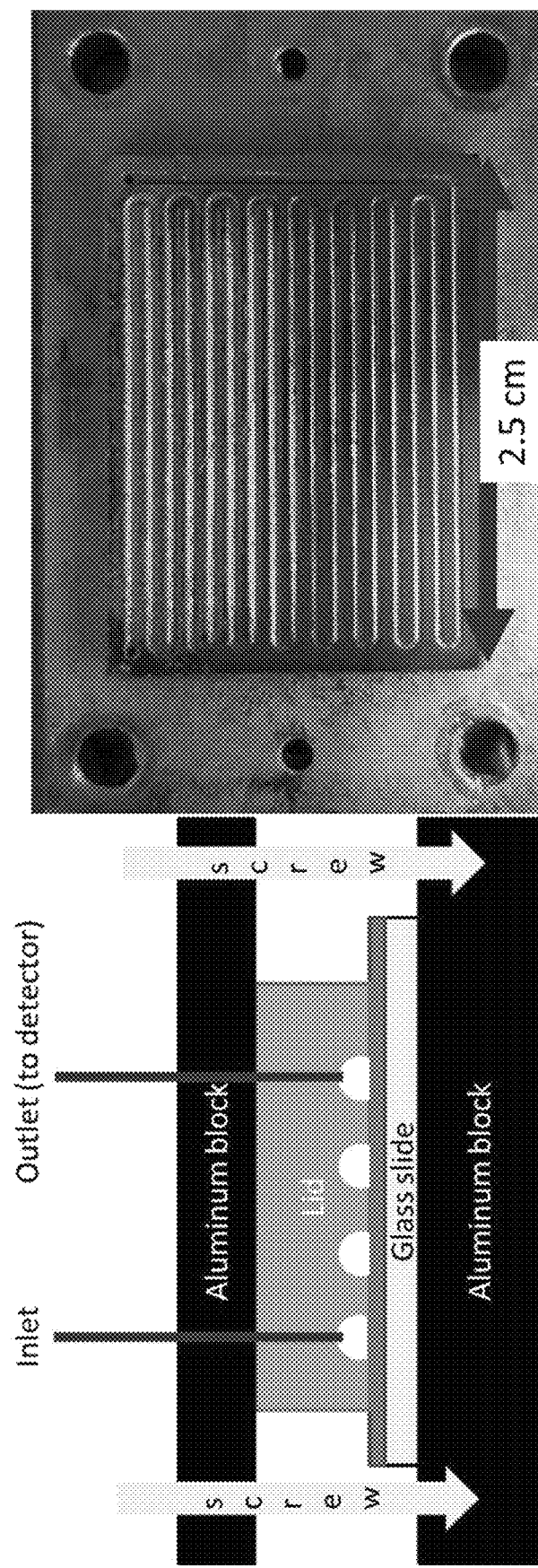
FIG. 1A is a side view schematic of a gas chromatography (GC) column assembly.
FIG. 1B is a picture of a microstamped GC column with block assembly.

After the epoxy was poured into the mold, the mold was topped with an aluminum block 1.5×1×0.25 inches with holes drilled into it to allow epoxy to fill the holes such that the epoxy lid and the aluminum block form a single unit. The lid with its stamped channel was cured at 80° C. for 2 hours and then at 150° C. for 3 hours. After curing it was sputter-coated with gold at four different angles to ensure all the surfaces in the channel are passivated with an inert material so that the chromatography is dominated to the intended stationary phase only. A high-production throughput alternative to sputter coating would be to use electroplating. Without passivation the analytes do not progress normally through the final column likely due to the partial permeability of the bare but cured epoxy. FIG. 1A illustrates the assembly for the device. FIG. 1B is an image of the epoxy based lid after gold coating but before final assembly onto the spin-coated glass slide or germanium prism.

The assembled grooved lid was pressed against the OV-1 coated glass slide or germanium prism using screws. The resultant columns were 0.3 m long. The GC micro-column was then installed into an HP 6890 Gas Chromatography system manufactured by Agilent Technologies (Santa Clara, Calif., USA). The clamped columns were successfully leak tested around their edges using a Restek helium Leak Detector with the columns held at an inlet pressure of up to 15 psi. For an initial study, 1 µL injections of a 10 ppm mixture of dodecane and hexadecane in acetone were used. The injector temperature was maintained at 250° C. with a pressure of 10 psi. The oven temperature (=temperature of the microfabricated column) was maintained at 125° C. for an isothermal GC experiment. Injections were operated in a splitless mode and the end of column signal was measured using a flame ionization detector (FID). A temperature ramp was also performed with the initial temperature maintained at 55° C. for three minutes, then ramped at 35° C./min to 150° C. and then held for 5 minutes.

Figure 2A:
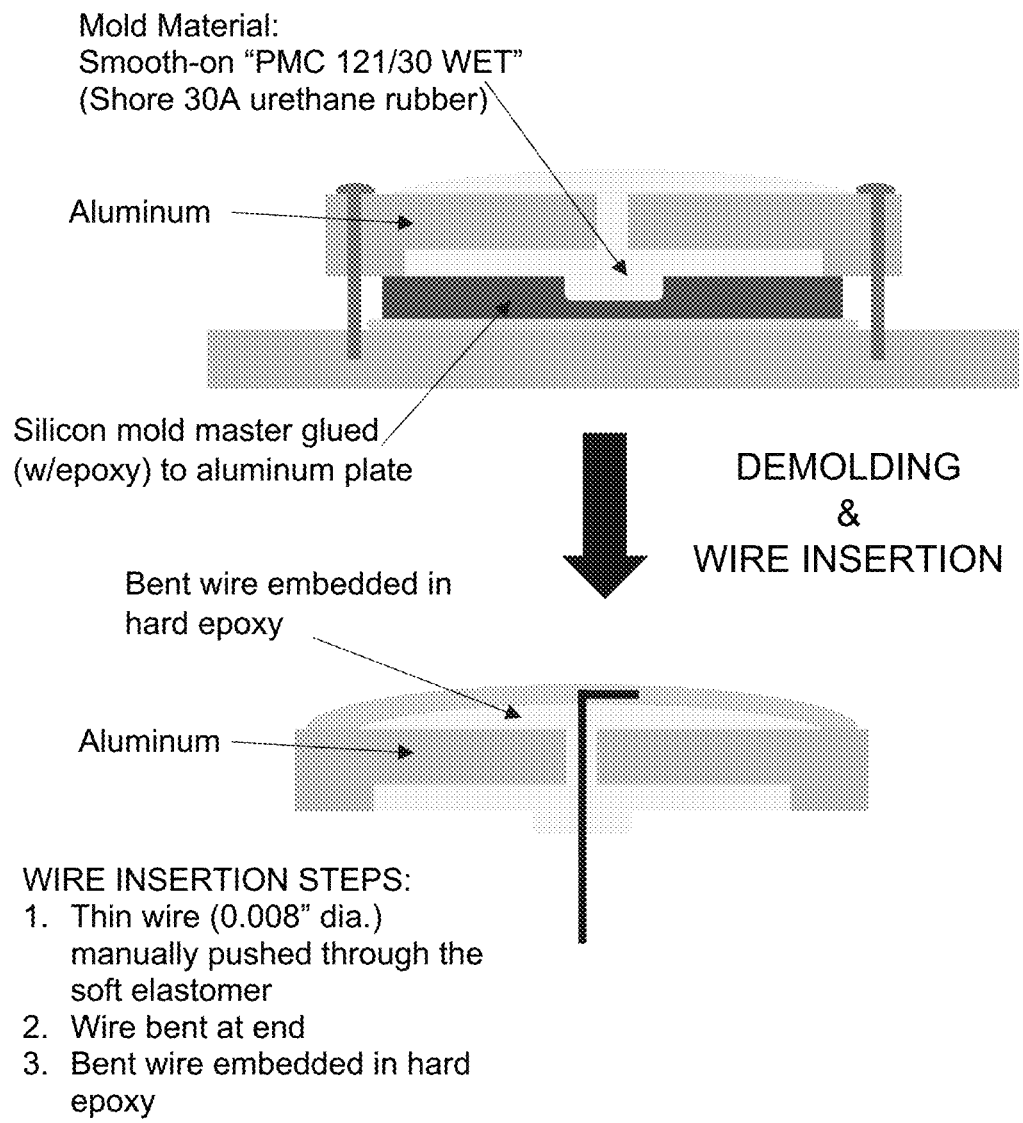
FIGS. 2A and 2B show the 2 step casting process.
Figure 2B:
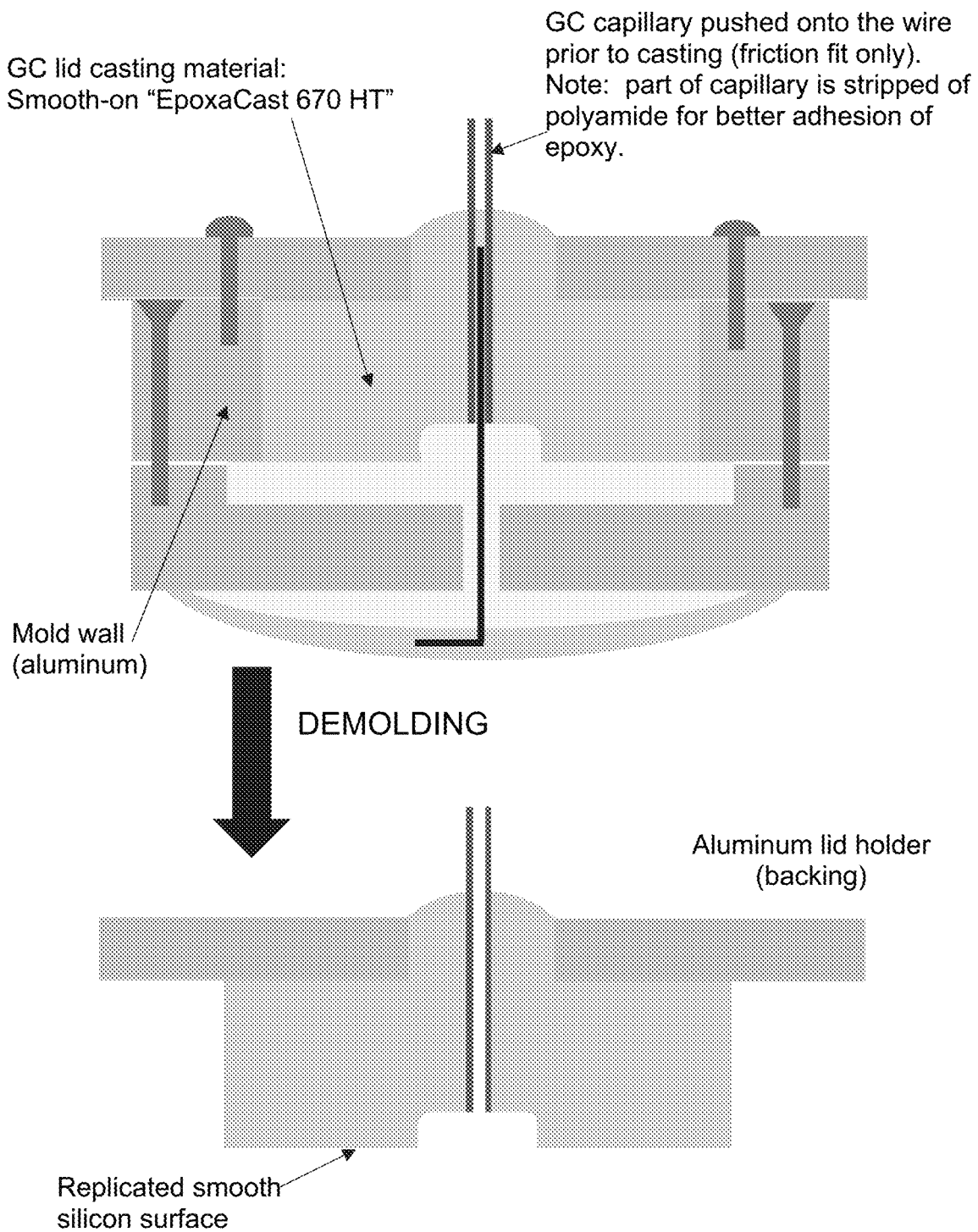

To ensure the surface of the molded grooved lid is as flat as possible a 2-step casting process could be used where the master mold is etched out of Silicon and a secondary and reusable mold is cast from that. FIGS. 2A and 2B show the 2 step casting process. Columns are etched into a silicon wafter using photolightography or laser etch techniques. A master mold is cased from this wafer. Subsequent lids are cast from the master mold. One step molding can also be performed: etch the negative into a silicon wafer and then directly cast lids from this master.

Figure 3:
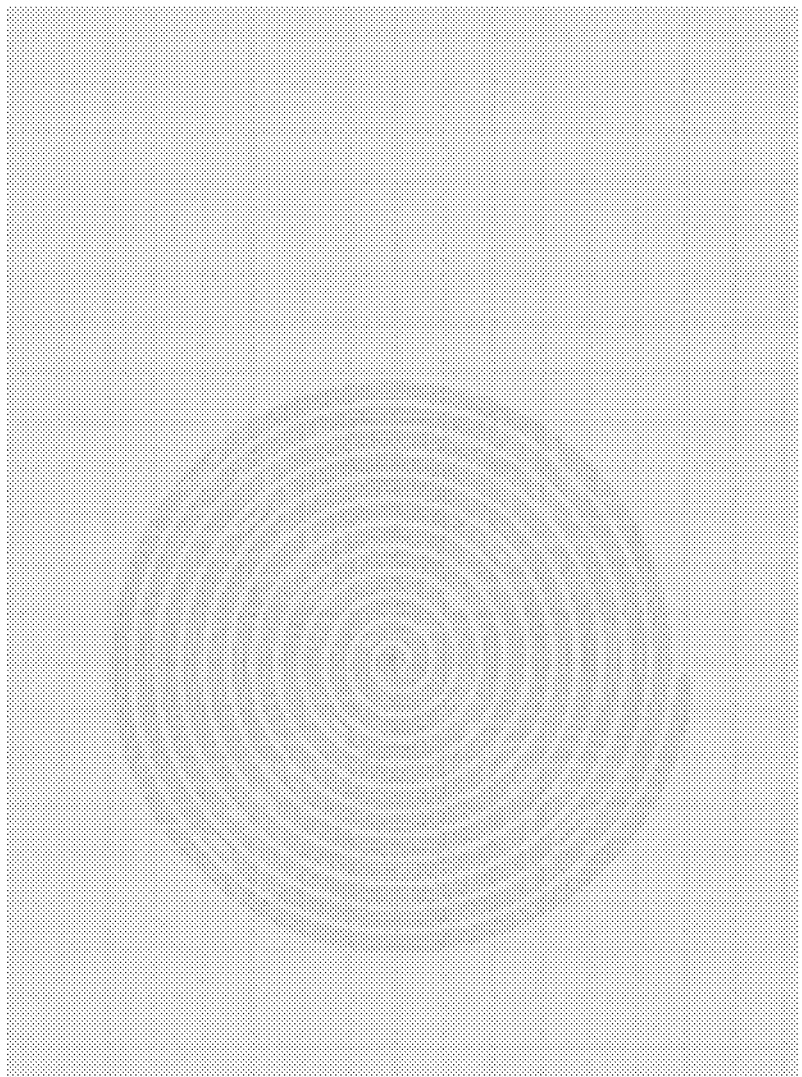
FIG. 3 shows a design of a 1 meter gas chromatography column.

Columns can be various lengths and have differing configurations. The above embodiment described a channel 0.3 long. Longer multi meter columns can also be designed. FIG. 3 is an example of one such design showing a column 1 m long.

The stationary phase can be spin coated or applied by some other means (solvent deposition, dropcast, inkjetting, dip pen lithography, laser ablation, laser assisted matrix depositions, aerosol/spraycoating etc.). The receiving substrate can be silicon, glass, polymer film or any other material. This substrate material may have to be passivated (e.g. evaporated metal film) prior to the coating of the stationary phase. While for most applications a smooth surface is preferred, roughened material may also be used. This would have two main purposes: inducing turbulence in the columns and for better adhesion of the stationary phase for certain materials (e.g. high surface tension, low viscosity) that would otherwise bead up and not form a uniform contiguous film. It is also envisioned that the substrate may be selectively etched or otherwise roughened along the whole or portions of the GC column path.

Stationary phases could be deposited as thickness gradients via spin coating to allow a thicker coating near the injection inlet of the column where there is a risk of analyte overloading the stationary phase, resulting in poor chromatography.

Injections into a GC-infrared absorption spectrography (GC-IRAS) module can be achieved by a single "slug" of analyte (by a syringe containing the analytes to be identified in a solvent) or by quick thermal desorption from a preconcentrator device or cryotrap (used to sample the inlet for a longer time period). The cryotrap or preconcentrator can be coated with a single non-selective sorbent material or can have several adjacent spots coated with a variety of selective sorbents. These spots can then be desorbed at different times using localized heaters. The desorption can occur in a short time period or can be subject to a precise temperature ramp.

EXAMPLE

Figure 4A:
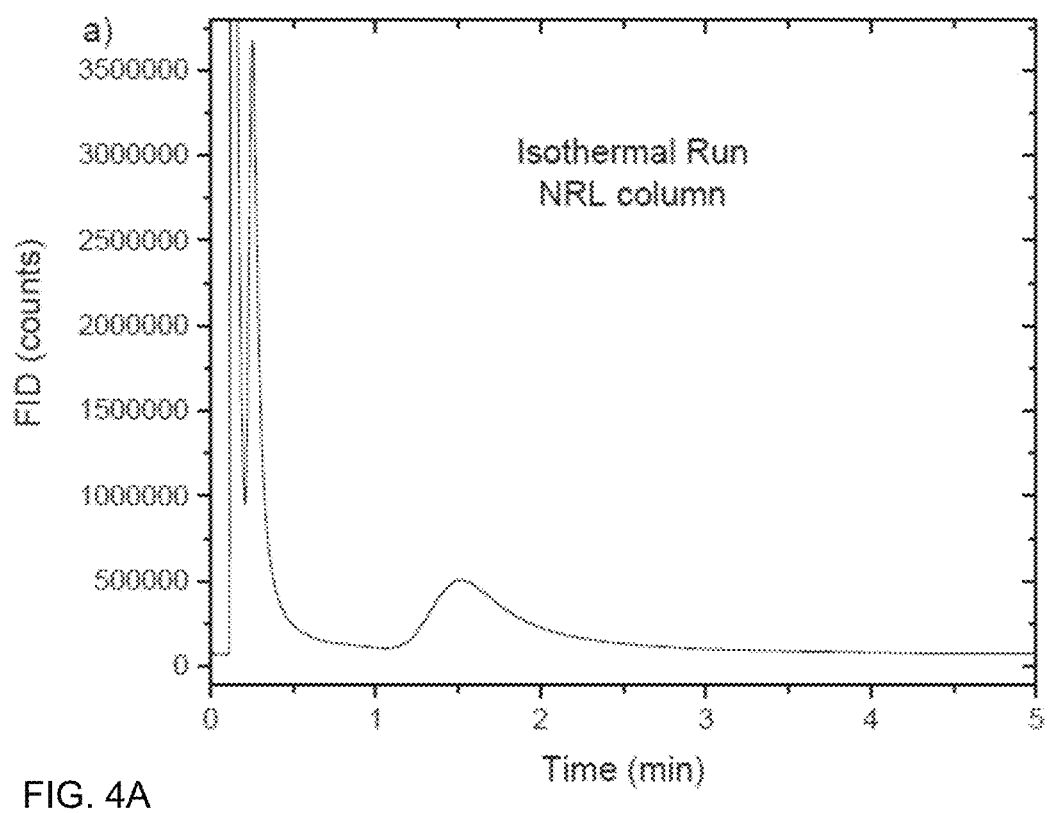
FIGS. 4A and 4B show chromatographs of a mixture of 10 ppm of dodecane and hexadecane in acetone. The results are from a 1 μL splitless injection with inlet pressure at 10 psi for an isotherm at 125° C.
Figure 4B:
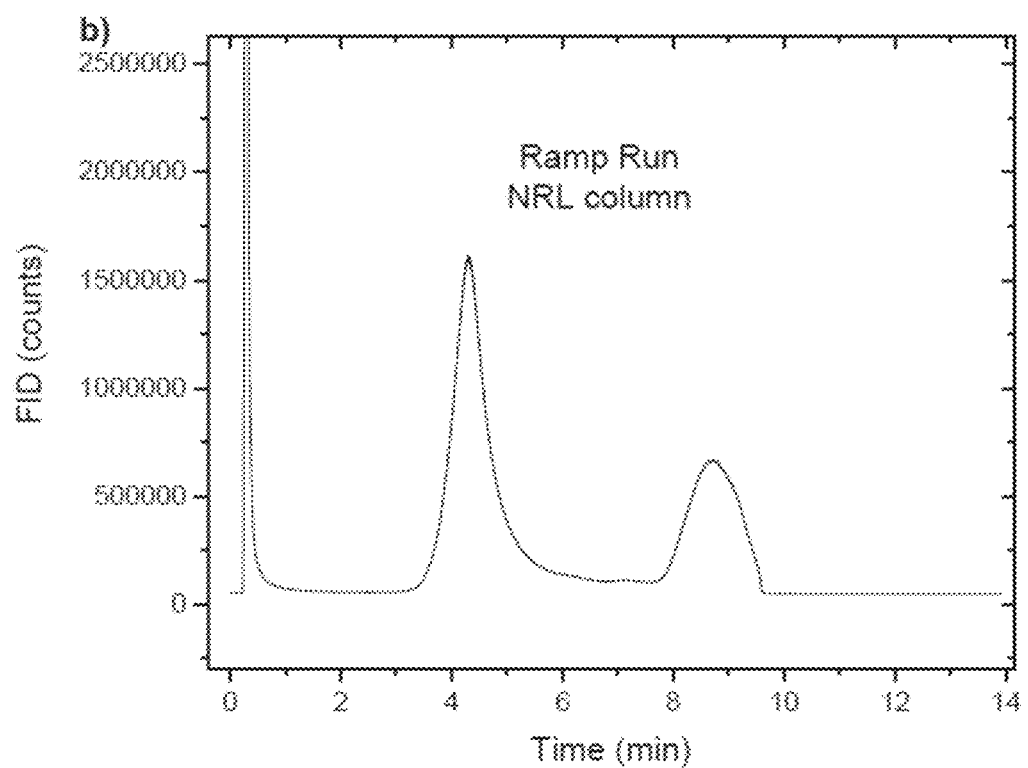

FIG. 4A shows the results of the separation of a two solute mixture of 10 ppm dodecane and hexadecane in acetone at 125° C. isothermal run. Three peaks are clearly visible, the first from the solvent (acetone), the second from the dodecane at 15.24 s with a full width half maximum (FWHM) of 3.84 s, and hexadecane at 95.4 s with a FWHM of 37 s. FIG. 4B shows the results from a temperature ramp experiment using the stamped or pressed column. Initially at 55° C. only the acetone elutes through the column. As the temperature is ramped the dodecane begins to elute at around 65° C. The dodecane peak has a FWHM of about 36 s and a retention time of 246 s. The hexadecane begins to elute out of the column at about 138 s after the GC oven has reached 150° C. The FWHM of the hexadecane peak is 71 s and the retention time is 510 s.

The novel design of the micro-stamped gas chromatography column of the present invention has been successfully demonstrated in the chromatographic separation of chemical mixtures. This work represents a novel approach to micro-GC fabrication by offering a facile method of applying a uniform layer of stationary phase via spin coating and completing the column by pressing an epoxy molded lid onto the coated substrate. In this first attempt, separation between dodecane and hexadecane was achieved with 40 theoretical plates at 125° C. Higher performance is anticipated with optimized designs. This micro stamping technique offers advantages over conventional techniques that require dynamic or static tubular column coating, primarily in fabrication times and overhead costs. The conventional coating processes require optimized conditions unique to each stationary phase; solvent, concentration, and evacuation time, which can take multiple hours to complete. Characterization of dynamically or static coated columns can only be performed by sacrificing a column and checking for uniformity along the column by destructive means. Spin coating is a much simpler method of coating and is much simpler to characterize post deposition using an AFM or other non-destructive probe technique.

In addition to the ease of stationary phase deposition this new GC column fabrication method offers a path to a plethora of separation techniques, such as multidimensional chromatography, and inverse chromatography just to name a few.

Multilayer Stationary Phase

Separate stationary phase types can be spin coated on top of each other. One option is to spin the first layer, cool to below its polymer glass transition point, then spin the next layer onto the cold first layer. Another option is a spin coating and stamp combination. First a spin coated stationary phase is deposited on the flat surface as described above. Then separately press a grooved lid onto a fresh flat surface and coat with a second stationary phase either dynamically or statically using normal procedures known in the art. After coating in this way, the coated grooved lid can be separated from its planar substrate and pressed onto the previously spun coated stationary phase. This can be performed with two different stationary phases for another type of multidimensional chromatography. This could also just be achieved with a single stationary phase type. Additionally, an adhesion promoting layer could be incorporated between two stationary phases of different polarities (e.g. amphiphilic structure). This layer could also act as an additional stationary phase. Layering different stationary phases allows for monolithing of the platform to avoid daisy chain devices together.

Multidimensional Chromatography

Multidimensional chromatography can be performed by placing multiple grooved lids together in series or in parallel or any combination of the two. The connections between modules are made by either blank (or guard column) capillaries or coated ones. When in parallel, the inlet capillary is split into a number of capillaries and delivered to multiple GC-IRAS modules. The length of each connecting capillary can be different and tailored to control the position of the peaks in the final chromatogram(s). After the last module, the capillaries are optionally combined and sent to one or more traditional detectors. Each GC module is compact and can have a separate temperature control for isotherms or temperature ramps. The timing and structure of individual temperature ramps can be tailored to achieve a desired separation behavior. Heating of the modules can be achieved by employing thermoelectric (TEC) (Peltier) elements, standard cartridge heaters, printed heatable traces or a combination of one of these. Since the modules are small, temperature ramps can be executed much faster than in a traditional GC oven. This lower "thermal inertia" also allows for pulsed heating by sending current pulses to TEC or printed heater traces.

Preconcentrator and Heating Embedding

After spin coating, relatively thick stationary phases can be ink jetted onto specific localized locations, including at the inlet and inside the column. This would serve the purpose of focusing analyte collection just prior to GC separation. The localized thick layer of stationary phase or sorbent could also be on the surface of the gas wetted grooved lid with independent localized heating and optical probing. Heating coils can be embedded to release analytes from thick regions. The GC focusing collector could be combined with a high flow external collector which is desorbed into the focusing collector embedded in the column to refocus the collected chemicals ready for injection as a narrow time width injection for analysis. Cooling can also be applied to the GC preconcentrator via methods known to the art (e.g., Peltier, liquid nitrogen, etc.) to maximize collection of high volatility chemicals. The preconcentrator could be thermally ramped to separate the highly volatile chemicals from the lower vapor pressure species, before column injection, to mitigate stationary phase overloading with large injection volumes. The preconcentrator could also be periodically thermally pulsed to produce a partial injection to avoid a need to perform a split injection which results in collected analyte not being analyzed.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method for making a micro stamped gas chromatography (GC) column, comprising:
    making a master mold comprising grooves;
    casting a reusable mold from the master mold;
    casting a GC lid comprising a rigid material from the reusable mold, wherein the GC lid comprises grooves to form a GC path;
    spin coating a stationary phase material on a planar substrate; and
    pressing the GC lid onto the stationary phase coated planar substrate to from an airtight seal, wherein a micro stamped GC column is formed without an adhesive or bonding process required.

2. The method of claim 1, wherein the GC lid comprising a rigid material is fabricated in an epoxy material.

3. The method of claim 1, wherein the master mold comprises etched silicon.

4. The method of claim 1, wherein the reusable mold comprises a polyurethane.

5. The method of claim 1, wherein the planar substrate is optically transparent.

6. The method of claim 1, additionally comprising passivating the rigid material with an inert material before pressing the GC lid onto the stationary phase coated substrate.

7. The method of claim 6, wherein the passivation comprises forming a gold layer.

8. The method of claim 1, wherein multiple stationary phase materials are spin coated onto the same planar substrate.

9. A method for making a micro stamped gas chromatography (GC) column, comprising:
    making a mold comprising grooves, wherein the grooves are the negative image of a GC path;
    casting a GC lid comprising a rigid material from a reusable mold, wherein the GC lid comprises grooves to form the GC path;
    spin coating a stationary phase material on a planar substrate;
    pressing the GC lid on the stationary phase coated planar substrate to from an airtight seal, wherein a micro stamped GC column is formed without an adhesive or bonding process.

10. The method of claim 9, wherein the rigid material comprises an epoxy.

11. The method of claim 9, wherein the mold comprises etched silicon.

12. The method of claim 9, wherein the planar substrate is optically transparent.

13. The method of claim 9, additionally comprising passivating the rigid material with an inert material before pressing the GC lid on the stationary phase material on the substrate.

14. The method of claim 13, wherein the passivation comprises forming a gold layer.

15. The method of claim 9, wherein multiple stationary phase materials are spin coated on the planar substrate.

16. A gas chromatography (GC) system comprising the GC column of claim 1.

17. The GC system of claim 16, wherein multiple GC columns of claim 1 are attached together either in parallel or in series.

* * * * *